(12) United States Patent
Inohiza

(10) Patent No.: US 8,655,403 B2
(45) Date of Patent: Feb. 18, 2014

(54) BROADCAST RECEIVER

(75) Inventor: Hirohiko Inohiza, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 613 days.

(21) Appl. No.: 12/091,924

(22) PCT Filed: Oct. 25, 2006

(86) PCT No.: PCT/JP2006/321280
§ 371 (c)(1),
(2), (4) Date: Jul. 23, 2009

(87) PCT Pub. No.: WO2007/049647
PCT Pub. Date: May 3, 2007

(65) Prior Publication Data
US 2009/0298531 A1    Dec. 3, 2009

(30) Foreign Application Priority Data
Oct. 28, 2005 (JP) .................... 2005-315469

(51) Int. Cl.
*H04M 1/00* (2006.01)
(52) U.S. Cl.
USPC ................................. 455/556.1
(58) Field of Classification Search
USPC ........ 455/424, 425, 456.5, 456.6, 561, 550.1, 455/575.1, 575.3, 556, 557, 3.02; 345/173, 345/156
See application file for complete search history.

(56) References Cited

U.S. PATENT DOCUMENTS 6,094,565 A * 7/2000 Alberth et al. ............. 455/575.3
6,931,198 B1 * 8/2005 Hamada et al. ............ 386/234
7,505,280 B1 * 3/2009 Loucks ..................... 361/752
7,577,461 B2 * 8/2009 Sawayama et al. ........ 455/556.1
7,779,166 B2 * 8/2010 Grant et al. ..................... 710/5

(Continued)

FOREIGN PATENT DOCUMENTS

JP   2003-110666    4/2003
JP   2003-329459    11/2003

(Continued)

OTHER PUBLICATIONS

Japanese language office action and its English language translation for corresponding Japanese application 2005315469 lists the references above.

(Continued)

*Primary Examiner* — Yuwen Pan
*Assistant Examiner* — Ankur Jain
(74) *Attorney, Agent, or Firm* — DLA Piper LLP (US)

(57) ABSTRACT

There is provided a control section 82 having a first function of commencing receipt of broadcast contents data in accordance with an open/closed state of the housing that is a result of detection performed by the housing status detection section or completing receiving operation in consideration of the content of received data; a second function of commencing or completing, during receipt of broadcast contents data, saving of data into a storage section 83 in accordance with the open/closed state of the housing that is a result of detection performed by the housing status detection section; and a third function of commencing or completing, during receipt of the broadcast contents data, playback of the data saved in the storage section 83 in accordance with the open/closed state of the housing that is a result of detection performed by the housing status detection section.

6 Claims, 6 Drawing Sheets

(56) References Cited

U.S. PATENT DOCUMENTS

| | | | |
|---|---|---|---|
| 7,813,761 B2* | 10/2010 | Minami | 455/556.1 |
| 7,822,444 B2* | 10/2010 | Hamamura et al. | 455/575.1 |
| 7,978,183 B2* | 7/2011 | Rosenberg et al. | 345/173 |
| 2002/0045467 A1* | 4/2002 | Hama | 455/567 |
| 2002/0137551 A1* | 9/2002 | Toba | 455/566 |
| 2005/0175320 A1* | 8/2005 | Miyazaki | 386/83 |
| 2006/0089098 A1* | 4/2006 | Taniguchi | 455/3.02 |
| 2006/0143670 A1* | 6/2006 | Kosha | 725/100 |
| 2006/0271999 A1* | 11/2006 | Wakako et al. | 725/135 |
| 2007/0254696 A1* | 11/2007 | Kajitani | 455/556.1 |
| 2009/0221327 A1* | 9/2009 | Tanaka et al. | 455/557 |

FOREIGN PATENT DOCUMENTS

| | | |
|---|---|---|
| JP | 2005-063254 | 3/2005 |
| JP | 2005-167687 | 6/2005 |
| JP | 2005260541 A | 9/2005 |

OTHER PUBLICATIONS

Chinese language Examination Rejection Decision dated Aug. 31, 2012 and its English language translation issued in corresponding Chinese application 200680040201.8.

* cited by examiner

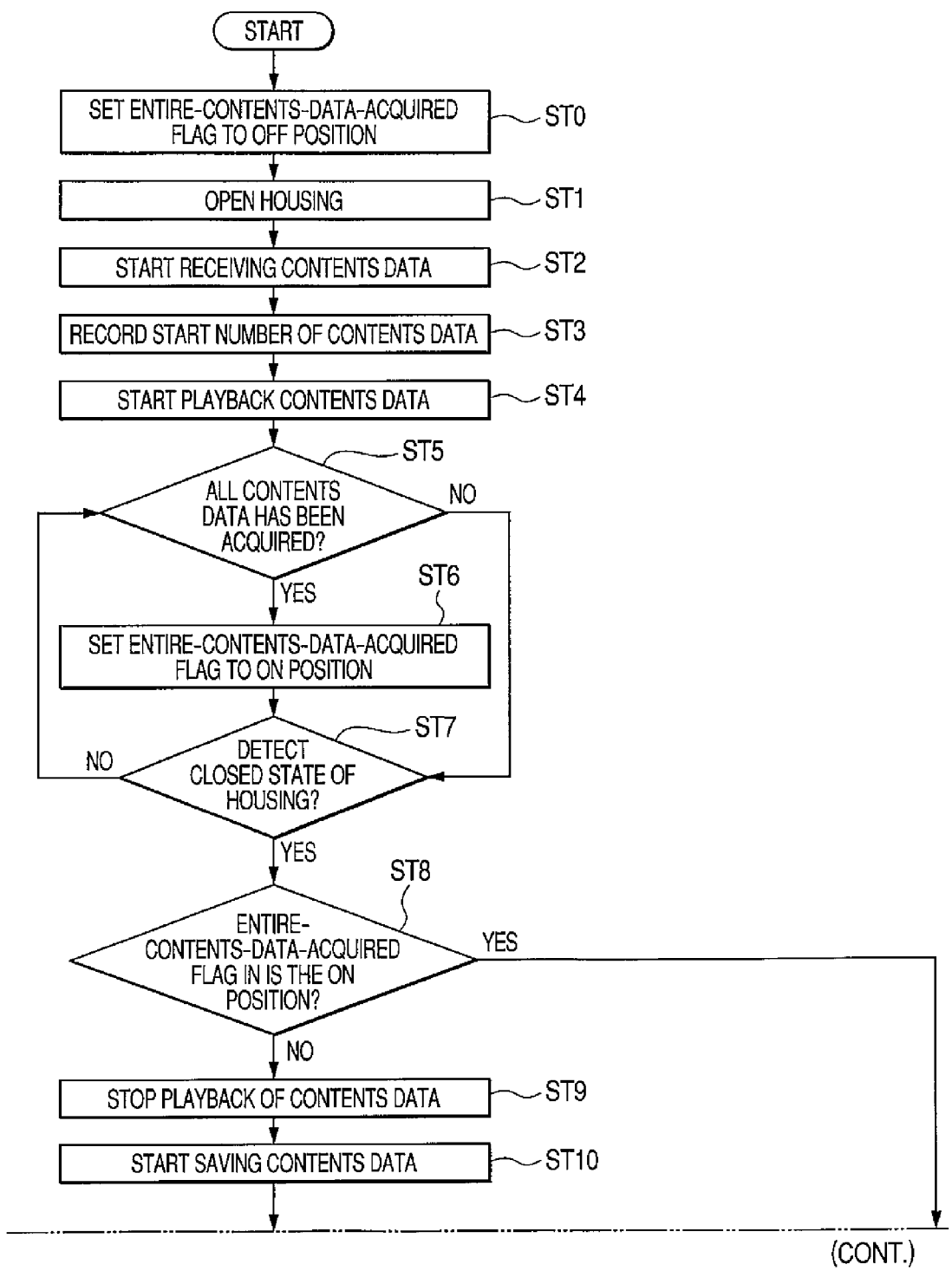

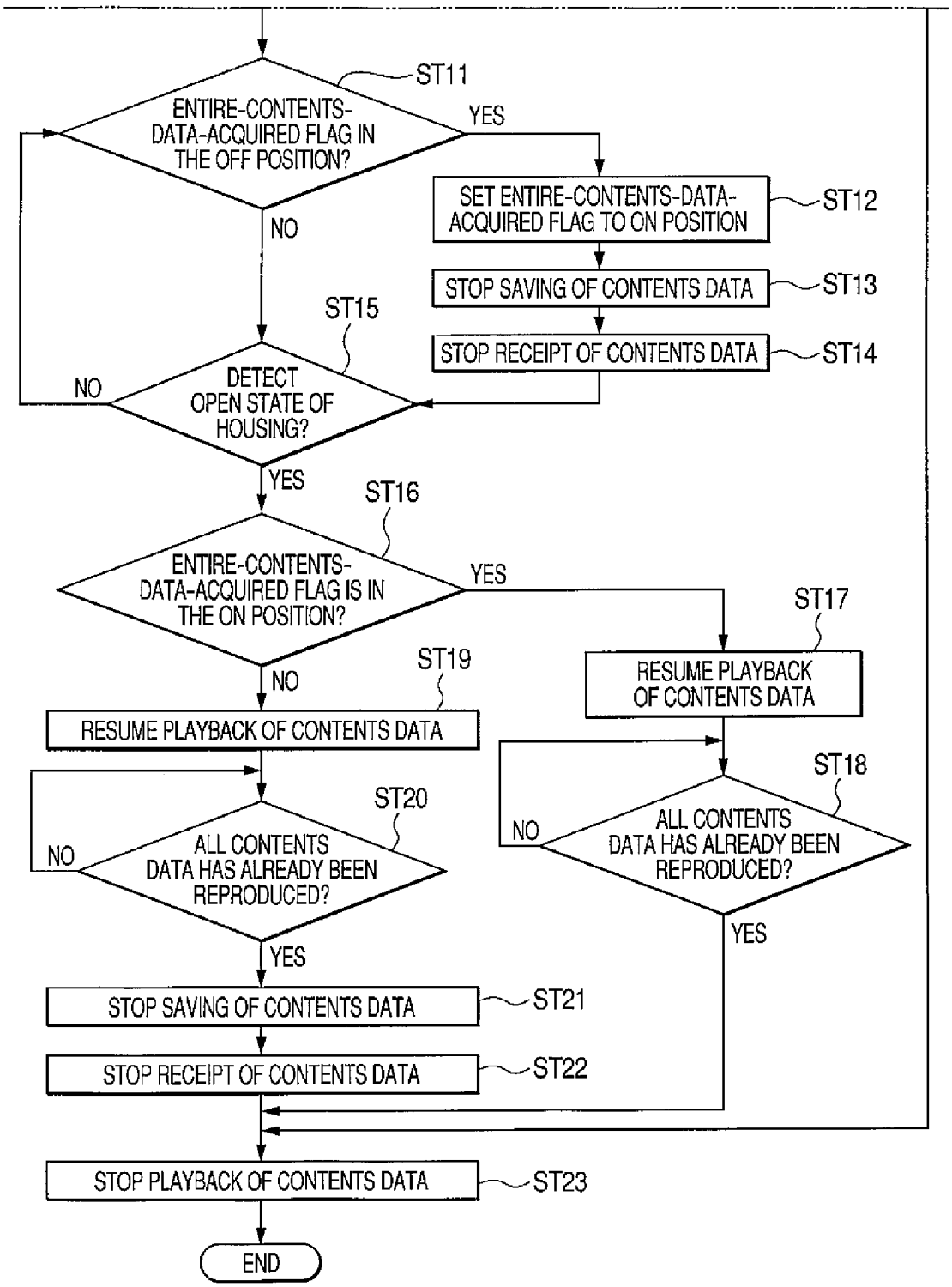

BROADCAST RECEIVER

TECHNICAL FIELD

The present invention relates to a broadcast receiver, such as a portable cellular phone, that has an openable and closable housing and that receives, stores, and plays broadcast contents data.

BACKGROUND ART

A portable cellular phone compatible with an analogue terrestrial television broadcasting and a terminal compatible with mobile broadcasting are now available as a portable terminal which is capable of receiving broadcast contents data. Service of portable cellular phones compatible with 1xEV-DO Rev. A (1x Evolution Data Only Revision. A) capable of performing broadcasting and multicasting of broadcast contents data is planed to be started in 2006.

Further, portable cellular phone carriers plan to commence service of portable cellular phones compatible with digital terrestrial broadcasting.

On account of sophistication of functions of a portable cellular phone, an increase in the capacity of a storage device of the portable cellular phone, an increase in wireless-communication speed, and an increase in amounts of contents data to be broadcast, the portable cellular phone is expected to hereafter used as a hard disk/recorder that saves broadcast contents data in internal memory or external memory and that plays the data at any desired time.

In a conceivable method, when receipt/playback of broadcast contents data is commenced by use of the portable terminal, a user operates key sections of the terminal, to thus activate an application for use in receiving broadcast contents data; and, when receipt/playback of the data is completed, operation is terminated by a key operation that instructs completion of the application.

Moreover, even when received data are stored in a memory of the terminal, there is a conceivable method for instructing saving and setting operations by means of a key operation.

A method proposed in Patent Document 1 is to stop playback of audio and video when the housing is changed from an open state to a closed state at the time of viewing video data including audio on a foldable portable cellular phone; and to resume playback of the audio and video when the housing is again opened.

Patent Document 1: JP-A-2003-110666

DISCLOSURE OF THE INVENTION

Problem that the Invention is to Solve

However, in the above proposed methods, the following problems could occur.

Receipt of broadcast contents data cannot be commenced or terminated, unless the user issues an instruction by means of key entry on the terminal. For this reason, when a change has arisen in circumstances of the user, the receiving status cannot be changed immediately.

Initiating or completing saving of broadcast contents data into the terminal cannot be performed, so long as the user does not issue an instruction by means of key entry on the terminal. Therefore, a saving status cannot be changed immediately when a change arises in the circumstances of the user.

Moreover, in the method described in Patent Document 1, when the enclosure is closed, playback is merely interrupted. When the enclosure is opened, playback of data being received is merely resumed. Therefore, data broadcast in a period of time during which playback has been continually interrupted are missed.

An objective of the present invention is to provide a broadcast receiver that can appropriately switch a receiving status, a saving status, and a playback status of broadcast contents data even when a change has arisen in circumstances.

Means for Solving the Problem

A first aspect of the present invention provides a broadcast receiver comprising:
a first housing having a display section;
a second housing having an operation section;
a broadcast receiving section which receives a broadcast content;
a recording section which records the received broadcast content; and
a control section, wherein:
the first housing and the second housing are openable and closable such that that the broadcast receiver can be an open state and a closed state; and
during the broadcast content received by the broadcast receiving section being displayed on the display section, if a state of the broadcast receiver in the open state changes to the closed state where the display section is hidden, the control section stops displaying of the broadcast content on the display section and records the broadcast content being received by the broadcast receiving section in the recording section.

A second aspect of the present invention provides a broadcast receiver comprising:
a first housing having a display section;
a second housing having an operation section;
a broadcast receiving section which receives a broadcast content;
a recording section which records the received broadcast content; and
a control section, wherein:
the first housing and the second housing are openable and closable such that the broadcast receiver can be an open state and a closed state;
during the broadcast content received by the broadcast receiving section being displayed on the display section, if a state of the broadcast receiver in the open state changes to the closed state where the display section is hidden, the control section stops displaying of the broadcast content on the display section and records the broadcast content being received by the broadcast receiving section into the recording section; and
if the state of the broadcast receiver changes from the closed state where the broadcast content is recorded in the recording section to the open state, the control section continues recording operation and displays on the display section information recorded in the recording section.

A third aspect of the present invention provides a broadcast receiver comprising:
a first housing having a display section;
a second housing having an operation section;
a broadcast receiving section which receives a broadcast content;
a recording section which records the received broadcast content; and
a control section, wherein:
the first housing and the second housing are openable and closable such that the broadcast receiver can be an open state and a closed state;

during the broadcast content received by the broadcast receiving section being displayed on the display section, if a state of the broadcast receiver in the closed state where the display section is exposed, changes to the open state, the control section stops displaying of the broadcast content on the display section and records the broadcast content being received by the broadcast receiving section into the recording section; and if the state of the broadcast receiver changes from the open state where the broadcast content is recorded in the recording section, to the closed state, the control section continues recording operation and displays on the display section information recorded in the recording section.

A fourth aspect of the present invention provides a broadcast receiver comprising:

a first housing having a display section;

a second housing having an operation section;

a broadcast receiving section which receives a broadcast content;

a recording section which records the received broadcast content; and a control section, wherein:

the first housing and the second housing are openable and closable such that the broadcast receiver can be an open state and a closed state;

during the broadcast content received by the broadcast receiving section being displayed on the display section, if a state of the broadcast receiver in the open state changes to the closed state where the display section is exposed, the control section stops displaying of the broadcast content on the display section and records the broadcast content being received by the broadcast receiving section into the recording section; and if the state of the broadcast receiver changes from the closed state where the broadcast content is recorded in the recording section, to the open state, the control section continues recording operation and displays on the display section information recorded in the recording section.

Preferably, the control section stops recording operation of the recording section when the broadcast is completed.

Advantage of the Invention

According to the present invention, even when a change arises in the circumstances, the receiving, saving, and playback states of broadcast contents data can be switched appropriately.

BRIEF DESCRIPTION OF THE DRAWINGS

FIG. 7 is a flowchart for describing overall control operation of the present embodiment.

DESCRIPTIONS OF THE REFERENCE NUMERALS

Figure 1:
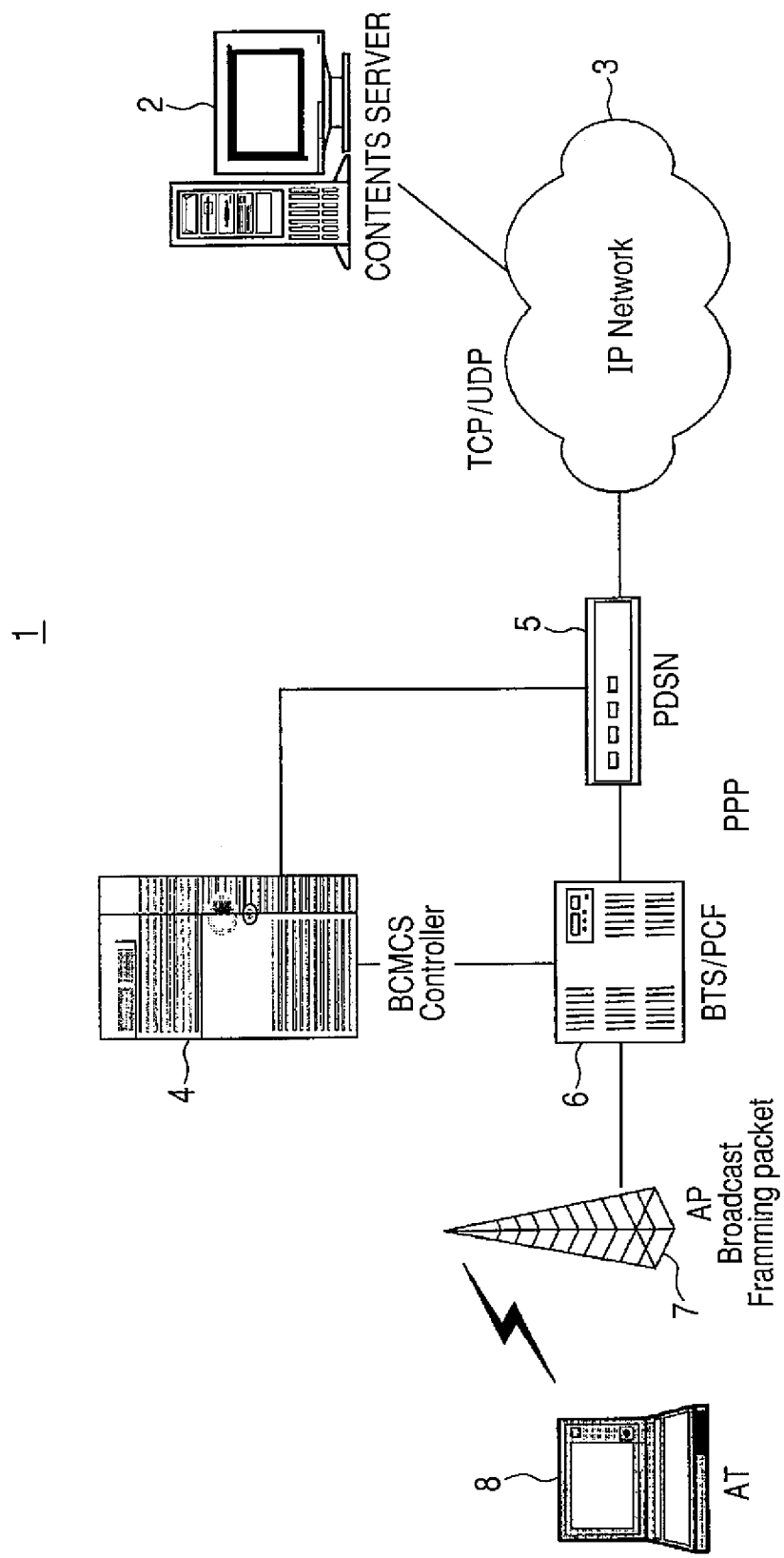
FIG. 1 is a schematic diagram of a wireless communication system of an embodiment of the present invention.

1 Wireless communication system
2 Contents server
3 IP network
4 Broadcast/Multiscan service (BCMCS) controller
5 PDSC 5
6 BTS/PCF
7 Access point (AT) serving as base station
8, 8A TO 8C Wireless communication terminals (AT)
81 Wireless communication section
82 Control section
83 Storage section
84 Display section
85 Audio processing section
86 Input section

BEST MODE FOR IMPLEMENTING THE INVENTION

An embodiment of the present invention will be hereinafter described by reference to the drawings.

FIG. 1 is a schematic diagram illustrating a broadcast receiver of the embodiment of the present invention and an example wireless communication system to which a wireless communication terminal having a broadcast receiving function can be applied.

In a wireless communication system 1 shown in FIG. 1, a contents server 2 is connected to a PDSN 5 that is controlled by a broadcasting/multicasting service (BCMCS) controller 4 by way of an IP network 3, and the PDSN 5 is connected to an access point (AP) 7 serving as a base station by way of a BTS/PCF (Base Transceiver Station/Point Coordination Function) 6. The PDSN 5 signifies a packet data processing node.

The term "BCMCS" signifies a broadcasting/multicasting service (Broadcast Multicast Service: BCMCS) that is one of the functions for which a 1xEV-DO communication scheme has currently, already been commercialized.

Broadcasting service is a service pattern in which a base station continually transmits; namely, broadcasts, data in a connectionless manner to the entire wireless communication terminal in a service area (e.g., a cell or a sector) of the base station by utilization of a wireless communication network.

Multicasting service is analogous to the broadcasting service. However, the service is one that enables only specific users holding a contract with specific service information (e.g., chargeable service) among wireless communication terminals located in a service area (e.g., a cell or a sector) to view the service.

The wireless communications system 1 and the wireless communications terminal (AT: Access Terminal) 8 of the present embodiment are configured so as to be applicable to; for example, at least the 1xEV-DO communications scheme (a second communications scheme), among a CDMA2000 1x scheme (a first communications scheme) of a code division multiplexing mode and a 1xEV-DO communications scheme (the second communications scheme) of a time division multiplexing connection mode.

A wireless communications terminal 8 of the present embodiment is embodied as a portable cellular phone.

For example, as will be described in detail later, the portable cellular phone includes two housings that are openably and closably joined together, such as a "foldable portable cellular phone," a "slide-type portable cellular phone," and a "biaxial rotary portable cellular phone"; and is configured so as to be able to appropriately switch a receiving status, saving status, and playback status of broadcast contents data in accordance with the open and closed state of the housing detected by a housing status detection section that detects the open and closed state.

The access point (AP) 7 serving as a base station takes a cell (or a sector) covered by itself as a service area; and broadcasts (distributes) service information from the contents server 2 to all wireless communications terminals (AT) 8 that are present in the service area.

The form of data that are broadcast by means of the broadcasting service or the multicasting service includes; for example, text information, audio or music information, video information, and the like. These pieces of information are called herein service information.

In the BCMCS, between the wireless communication terminal (AT) 8 and the access point (AP) 7 serving as a base station, data broadcasted by the access point (AP) 7 are received by the wireless communication terminal (AT) 8 in one-direction manner.

The wireless communication terminal (AT) 8 in the process of performing broadcasting service first continually receives broadcast data for the most part. When some of packets cannot have been (have failed to be) received for any reasons, the wireless communication terminal awaits rebroadcasting of the packets (resending of the packets is awaited).

In the present embodiment, during rebroadcasting being awaited (resending of packets), transfer rates are determined from all of the data received so far and most recently received data (received within a period of, e.g., 30 seconds), and a time which will elapse before second arrival of the packets necessary for the wireless communication terminal is predicted. The wireless communication terminal (AT) 8 suspends (pauses or stops) continual receiving operation for receiving broadcast data until the time comes; and intermittently receives, at an interval assigned to the wireless communication terminal, control information about the access point (AP) 7 serving as a base station.

At this time, the wireless communication terminal (AT) 8 receives broadcast data, which are broadcast at irregular intervals, when ascertaining a communication status achieved in the middle of intermittent receiving operation during which control information about the access point (AP) 7 serving as a base station is monitored; and corrects a time that will elapse before arrival of packets which wait to be rebroadcast next time.

When transmission of a BCMCS flow registration message before timing of the next intermittent receiving operation is determined to be necessary at that time, the BCMCS flow registration message is transmitted in advance. When transmission of the BCMCS flow registration message is not necessary for a system, transmission of the message may also be omitted.

The wireless communication terminal (AT) 8 of the present embodiment will now be described.

Figure 2:
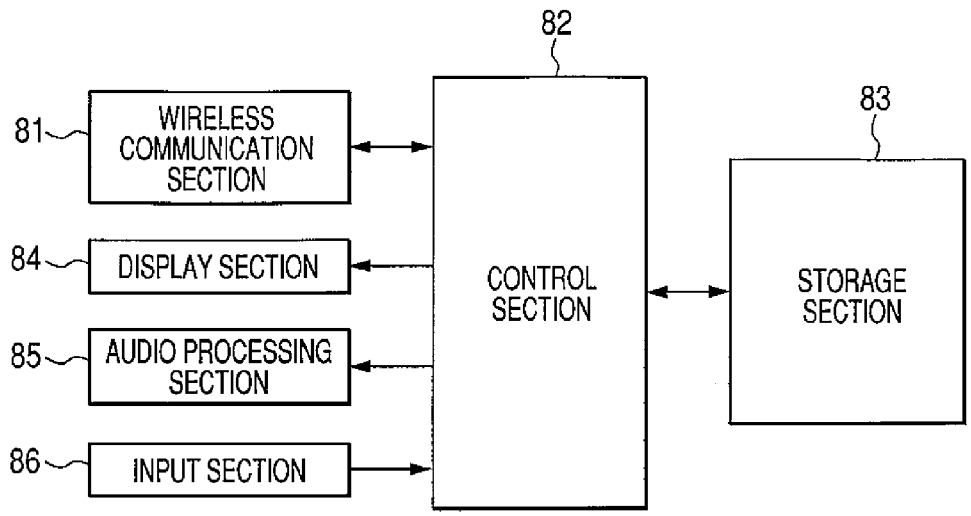
FIG. 2 is a block diagram showing the configuration of a wireless communication terminal (AT) 8 of the present embodiment.

FIG. 2 is a block diagram showing the configuration of the wireless communication terminal (AT) 8 of the present embodiment.

Figure 3:
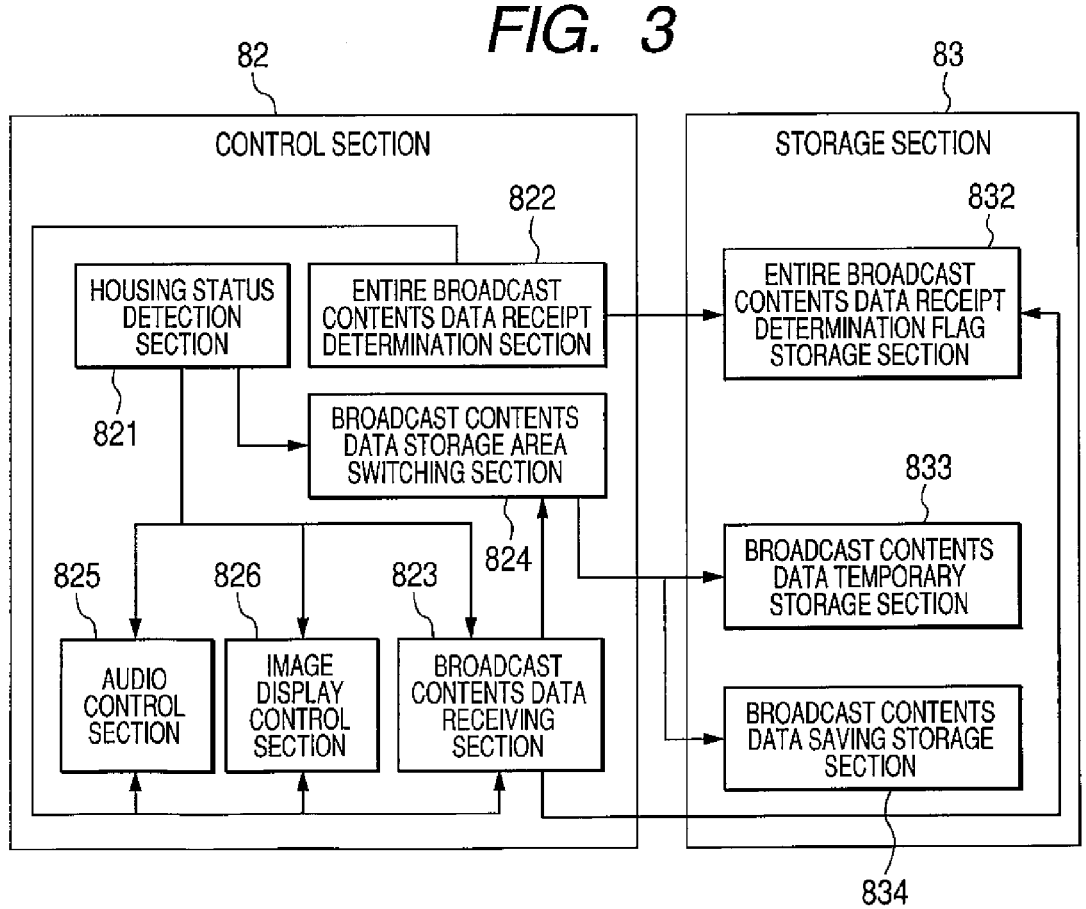
FIG. 3 is a functional block diagram of a control section and a storage section in the wireless communication terminal (AT) 8 of the embodiment.

FIG. 3 is a functional block diagram of a control section and a storage section in the wireless communication terminal (AT) 8 of the present embodiment.

The wireless communication terminal (AT) 8 is compatible with receipt of the BCMCS as well as with receipt of ordinary audio communication and data communication; and has as main constituent elements a wireless communication section 81 including an antenna and an RF circuit, a control section 82, a storage section 83, a display section 84, an audio processing section 85, and an input section 86.

The wireless communication section 81 receives, by means of an antenna, radio waves transmitted from the access point (AP) 7 serving as a base station; and transmits the thus-received radio wave to the access point (AP) 7.

The wireless communication section 81 demodulates a high frequency signal received by the antenna into a digital signal; modulates the digital signal to be transmitted under control of the control section 82; and transmits the thus-modulated digital signal by way of the antenna.

The control section 82 executes a program stored in the storage section 83, thereby processing control of operation of audio communication and data communication and various services utilizing wireless communication.

The control section 82 controls; for example, receipt of service information about broadcasting service, switching (handoff) of an access point (AP), and the like.

The controls section 82 detects open and closed states of the two housings and performs control operation so as to appropriately switch the receiving status, saving status, and playback status of broadcast contents data in accordance with the detected open/closed state of the housings.

The control section 82 has a receipt control function for capturing broadcast contents data (broadcast data) received by means of the wireless communication section 81, a data playback control function, and a function for controlling storage of data into the storage section 83.

In order to appropriately implement switching among the receiving status, saving status, and playback status of the broadcast contents data, the control section 82 has a housing status detection section 821, an entire broadcast contents data receipt determination section 822, a broadcast contents data receiving section 823, a broadcast contents data storage area switching section 824, an audio control section 825, and an image playback control section 826, as shown in FIG. 3.

The housing status detection section 821 detects the open and closed states of the two housings.

The entire broadcast contents data receipt determination section 822 determines whether or not all broadcast contents data have been received.

The broadcast contents data receiving section 823 receives broadcast contents data in accordance with a result of detection of an open/closed state performed by the housing status detection section 821.

The broadcast content data storage area switching section 824 performs control for switching storage areas in the storage section 83 in accordance with a result of detection of the open or closed state of the housing status detection section 821 and the state of the broadcast contents data receiving section 823.

The audio control section 825 controls an audio output from the audio processing section 85 in accordance with received data.

The image playback control section 826 controls a display of image data on the display section 84 in accordance with received data.

The control section 82 can perform the following communication control operations.

At the time of control of receipt of service information, the control section 82 controls the wireless communication section 81, thereby first continually receiving broadcast data for the most part during broadcasting service is performed. When some of the packets cannot have been received for any reasons, the control section awaits rebroadcasting of the packets.

The control section 82 determines transfer rates from all of the data received so far and the most recently received data (received within a period of; for example, 30 seconds) in the middle of awaiting rebroadcasting of the packets (waiting for rebroadcasting operation), thereby predicting a time that will elapse before arrival of the packets rebroadcast next time. The wireless communication terminal (AT) 8 suspends (pauses or stops) continual receiving operation for receiving broadcast data until the time comes, thereby intermittently receiving, at intervals assigned to the wireless communication terminal, the broadcast data.

The control section 82 receives the broadcast data transmitted at irregular intervals when ascertaining a communication status achieved in the middle of intermittent receiving operation, and corrects a time which will elapse before arrival of packets to be rebroadcast next time. When determined, at that time, a necessity for transmission of the BCMCS flow registration message before timing of the next intermittent receiving operation, the control section 82 controls the wireless communication section 81 and transmits the BCMCS flow registration message in advance. When advanced transmission of the BCMCS flow registration message is not necessary for a system, transmission of the message may also be omitted.

The storage section 83 stores information and a control program necessary for operation of the wireless communication terminal (AT) 8. For instance, service information being currently received by the wireless communication terminal (AT) 8, information acquired by means of processing service information in the control section 82 at the time of receipt of the service information, and neighbor base station information received from the access point (AP) 7 serving as a base station are stored.

In order to store information acquired when the control section 82 receives broadcast data serving as service information, the storage section 83 includes, as shown in FIG. 3, an entire broadcast contents data receipt determination flag storage section 832, a broadcast contents data temporary storage section 833, and a broadcast contents data saving storage section 834.

A result of determination made by the entire broadcast contents data receipt determination section 822 of the control section 82 and a receipt determination flag set on or off according to a receiving state of the broadcast contents data receiving section 823 are stored in the entire broadcast contents data receipt determination flag storage section 832.

The broadcast contents data storage area switching section 824 of the control section 82 controls, in a switchable manner, the broadcast contents data temporary storage section 833 and the broadcast contents data saving storage section 834, whereupon data are saved.

The display section 84 is controlled by the control section 82 and displays text information, image information, and operating status (field intensity, an amount of electric power remaining in a battery, a time, and the like) of the wireless communication terminal (AT) 8, and others. The display section 84 includes a display panel; for example, an LCD, a backlight for illuminating the display panel, and the like.

The audio processing section 85 includes a speaker and a microphone. The microphone converts input voice into an electric signal; amplifies the electric signal; subjects the signal to analogue-to-digital conversion; subject a resultant digital signal to signal processing such as encoding; and outputs to the control section 82 audio data that is a result of processing.

The audio processing section 85 subjects the audio data conforming to the received data input from the control section 82, and the like, to processing, such as decryption, digital-to-analogue conversion, and amplification, to thus generate an audio signal; converts the audio signal into sound by means of the speaker; and outputs the sound from the speaker.

The input section 86 receives an input of a text, an input of a numeral, an operating instruction for the wireless communication terminal (AT) 8, and the like.

The wireless communication terminal 8 of the present embodiment capable of detecting the open/closed state of the housing is classified into a "foldable portable cellular phone," a "slide-type portable cellular phone," and a "biaxial rotary portable cellular phone," and a status transition will be described in connection primarily with control operation of the control section 82 by reference to FIGS. 4 through 6. Subsequently, the entire control operation will be described by reference to a flowchart shown in FIG. 7.

Figure 4:
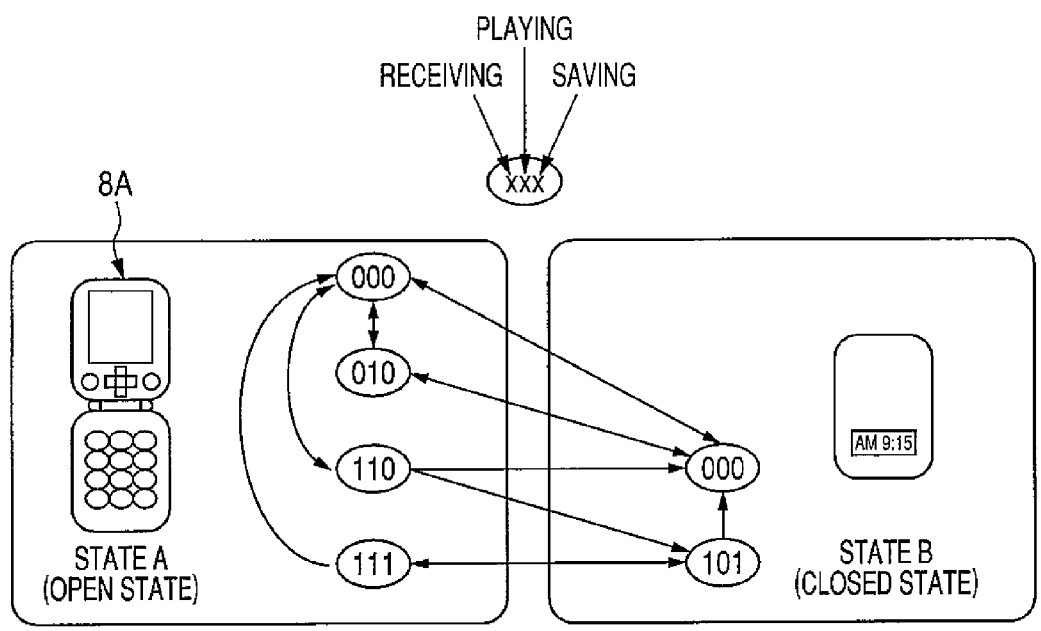
FIG. 4 is a status transition diagram achieved when the wireless communication terminal of the embodiment is a foldable portable cellular phone.

FIG. 4 is a status transition diagram of the foldable portable cellular phone; FIG. 5 is a status transition diagram of the slide-type portable cellular phone; and FIG. 6 is a status transition diagram of a biaxial rotary portable cellular phone.

First, the status transition of the foldable portable cellular phone will be described by reference to FIG. 4.

Descriptions about the "Status Transition of the Foldable Portable Cellular Phone"

FIG. 4 is an example status transition diagram achieved when the wireless communication terminal of the present embodiment is a foldable portable cellular phone.

In the drawing, a status A designates an open state of a housing, and a status B designates a closed state of the same. In the drawing, numerals in an ellipse designate the internal state of the terminal; namely, sequentially designate the receiving state, the playing state, and the saving state of data. Reference numeral 0 designates an invalid state, and 1 designates a valid state (for example; 110→a receiving state ON: a playing state ON: and a saving state OFF)

Internal statuses of the terminal achieved in respective states of the housing will be described later. In order to make an example easy to understand, contents data to be broadcast herein are assumed to be data having the property of periodically being iterated.

<Housing State (Open State) A>

Internal status 000: All of the receiving state, the playing state, and the saving state are OFF. In this state, when the user instructs playback of the data saved in the storage section (hereinafter called "memory") 83 by means of key entry performed by way of the input section 86, there arises a transition to an internal status 010, where the data are played. When the user instructs viewing of broadcast data in this state (an internal status 000) by means of key entry, there arises a transition to an internal status 110, where receipt and playback of data are commenced. When the housing is closed in this state (the internal status 000), to thus come into a housing status B, the internal status remains unchanged.

Internal status 010: The playing state is ON, and the receiving and saving states are OFF. When the user instructs completion of playback operation in this state by means of key entry or when playback of data stored in the storage section (hereinafter called "memory") 83 is completed, there arises a transition to the internal status 000. When the housing is closed in this state (the internal status 010), to thus enter the housing state B, the user is determined to have closed the housing in order to complete playback operation, and there arises a transition to the internal status 000.

Internal status 110: The playing and receiving states are ON, and the saving state is OFF. When the housing is closed in this state, to thus come into the housing state B, a determination is made as to whether or not data corresponding to one period have already been received. When data corresponding to one period are already received, the user is determined to have closed the housing in order to complete receiving and playback operations, and there arises a transition to the internal status 000 of the housing status B. When receipt of data corresponding to one period are not yet completed, there arises a transition to the internal status 101, where playback operation is stopped and where saving of received data into the memory 83 is commenced. When in this state (the internal status 110) the user instructs completion of viewing operation by means of key entry, there arises a transition to the internal status 000 of the housing state A.

Internal status 111: All of the receiving state, the playing state, and the saving state are ON. When in this state playback of data corresponding to one period is completed or the user instructs completion of playback by means of key entry, there arises a transition to the internal status 000. When the housing is closed in this state (the internal status 111), to thus enter the housing state B, the user is determined to be attempting to interrupt playback of data, and there arises a transition to the internal status 101, where playback is stopped and saving received data into the memory 83 through background processing is continued.

<Housing State B>

Internal status 000: All of the receiving state, the playing state, and the saving state are OFF. When receipt of data corresponding to one period is completed in the housing state B and there arises a transition to this status and when the housing state enters the housing state A as a result of opening of the housing, there arises a transition to the internal status 010, and data stored in the memory 83 is played. When the portable cellular phone enters the housing state A in other cases as a result of opening of the housing, the internal state remains unchanged.

Internal status 101: The receiving and saving states are ON, and the playing state is OFF. This state is a situation where received data are being saved in the memory 83 through background operation. When receipt of data corresponding to one period is completed in this state, there arises a transition to the internal status 000. When receipt of the data corresponding to one period is not yet completed and when the housing state comes into the housing state A as a result of opening of the housing, there arises a transition to the internal status 111, and the saved data are played while received data are being saved in the memory 83.

Descriptions about "Status Transition of a Slide-Type Portable Cellular Phone"

Figure 5:
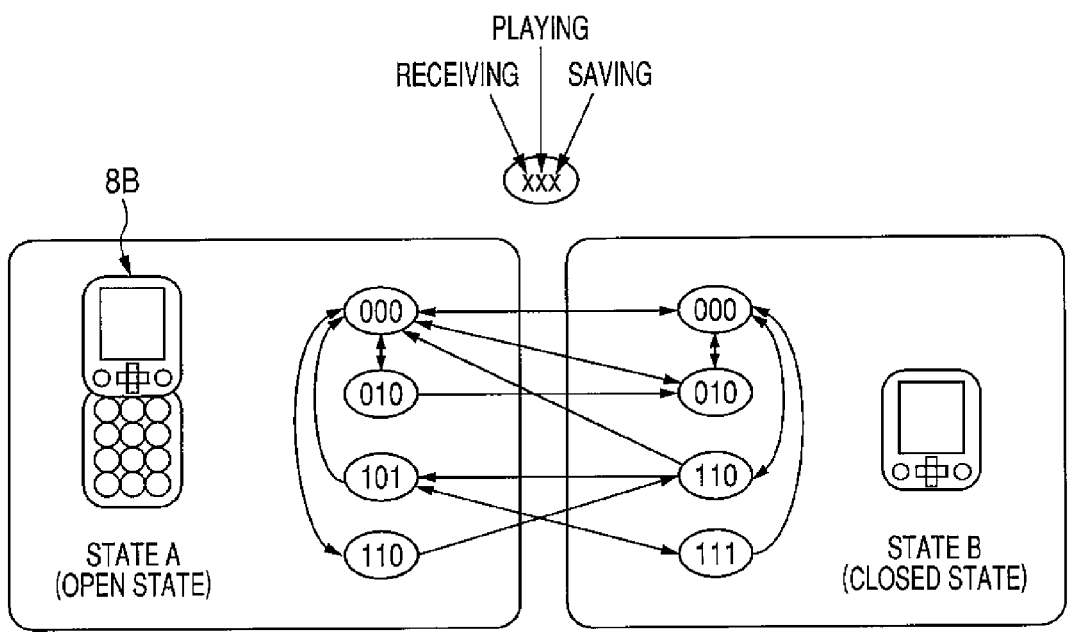
FIG. 5 is a status transition diagram achieved when the wireless communication terminal of the embodiment is a slide-type portable cellular phone.

FIG. 5 shows an example status transition diagram achieved when the wireless communication terminal of the embodiment is a slide-type portable cellular phone.

In the drawings, a state A shows an open state of the housing, and a state B shows a closed state of the housing. Numerals in an ellipse designate the internal state of the terminal; namely, sequentially designate the receiving state, the playing state, and the saving state of data. Reference numeral 0 designates an invalid state, and 1 designates a valid state (for example: 110→a receiving state ON: a playing state ON: and a saving state OFF)

Internal statuses of the terminal achieved in respective states of the housing will be described later. In order to make an example easy to understand, contents data to be broadcast herein are assumed to be data having the property of periodically being iterated.

<Housing State A>

Internal status 000: All of the receiving state, the playing state, and the saving state are OFF. In this state, when the user instructs playback of the data saved in the memory 83 by means of key entry performed by way of the input section 86, there arises a transition to an internal status 010 of the housing state A, where the data are played. When the user send to the control section 82 an instruction for viewing broadcast data in this state (the internal status 000) by means of key entry, there arises a transition to the internal status 110, where receipt and playback of data are commenced. When the internal status 101 of the housing state A changes to this status (the internal status 000) or when the internal status 010 of the housing state B changes to this status (the internal status 000), and when the housing state changes to the housing state B as a result of the housing being closed in this state (the internal status 000), there arises a transition to the internal status 010 of the housing state B, and playback is performed. When the housing state comes into the housing state B in other cases (the internal status 000) as a result of closing of the housing, the internal status remains unchanged.

Internal status 010: The playing state is ON, and the receiving and saving states are OFF. When the user instructs the control section 82 to complete playback operation by means of key entry or when playback of the data saved in the memory 83 is completed, there arises a transition to the internal status 000. When the housing state comes into the housing state B as a result of closing of the housing in this state (the internal status 010), the internal status remains unchanged.

Internal status 101: The receiving state and the saving state are ON, and the playing state is OFF. The playing and receiving states are ON, and the saving state is OFF. This state is a situation where the user is in the middle of performing another operation by means of temporarily interrupting viewing of data and where received data are saved in the memory through background operation. When receipt of data corresponding to one period is completed in this state, there arises a transition to the internal status 000. When the housing state comes into the housing state B as a result of the housing being closed in this state (the internal status 101), an operation other than viewing of data is determined to be completed, and there arises a transition to the internal status 111, where the saved data are played while received data are being saved in the memory 83.

Internal status 110: The playing and receiving states are ON, and the saving state is OFF. When the housing is closed in this state, to thus enter the housing state B, the internal status remains unchanged. When in this state the user instructs completion of playback operation by means of key entry, there arises a transition to the internal status 000.

<Housing State B>

Internal status 000: All of the receiving state, the playing state, and the saving state are OFF. In this state, when the user instructs playback of the data saved in the memory 83 by means of key entry, there arises a transition to an internal status 010, where the data are played. When the user instructs viewing of broadcast data in this state (the internal status 000) by means of key entry, there arises a transition to the internal status 110, where receipt and playback of data are commenced. When the housing state comes into the housing state A in this state (the internal status 000) as a result of opening of the housing, the internal status remains unchanged.

Internal status 010: The playing state is ON, and the receiving and saving states are OFF. When the user instructs completion of playback operation in this state (the internal status 010) by means of key entry or when playback of data stored in the memory 83 is completed, there arises a transition to the internal status 000 of the housing state B. When the housing is opened in this state (the internal status 010), to thus enter the housing state A, the user is determined to be attempting to perform another operation by temporarily interrupting playback of data; there arises a transition to the internal status 000 of the housing state A; and playback is stopped.

Internal status 110: The playing and receiving states are ON, and the saving state is OFF. When the user instructs completion of viewing operation in this state by means of key entry, there arises a transition to the internal status 000 of the housing state B. When the housing is opened in this state (the internal status 110), to thus enter the housing state A, the user is determined to be attempting to perform another operation by means of temporarily interrupting viewing of data, and hence playback is suspended. Further, a determination is made as to whether or not data corresponding to one period have already been received. When the data corresponding to one period are determined to have already been received, there arises a transition to the internal status 000 of the housing state A. When the data are determined not to be received yet, there arises a transition to the internal status 101, where saving received data into the memory through background operation is commenced.

Internal status 111: All of the receiving state, the playing state, and the saving state are ON. When in this state playback of data corresponding to one period is completed or the user instructs completion of playback by means of key entry, there arises a transition to the internal status 000. When the housing is opened in this state (the internal status 111), to thus enter the housing state A, the user is determined to be attempting to perform another operation by means of temporarily interrupting playback of data, and there arises a transition to the internal status 101, where playback is stopped and saving received data into the memory 83 through background operation is continued.

Descriptions about "Status Transition of a Biaxial Rotary Portable Cellular Phone"

Figure 6:
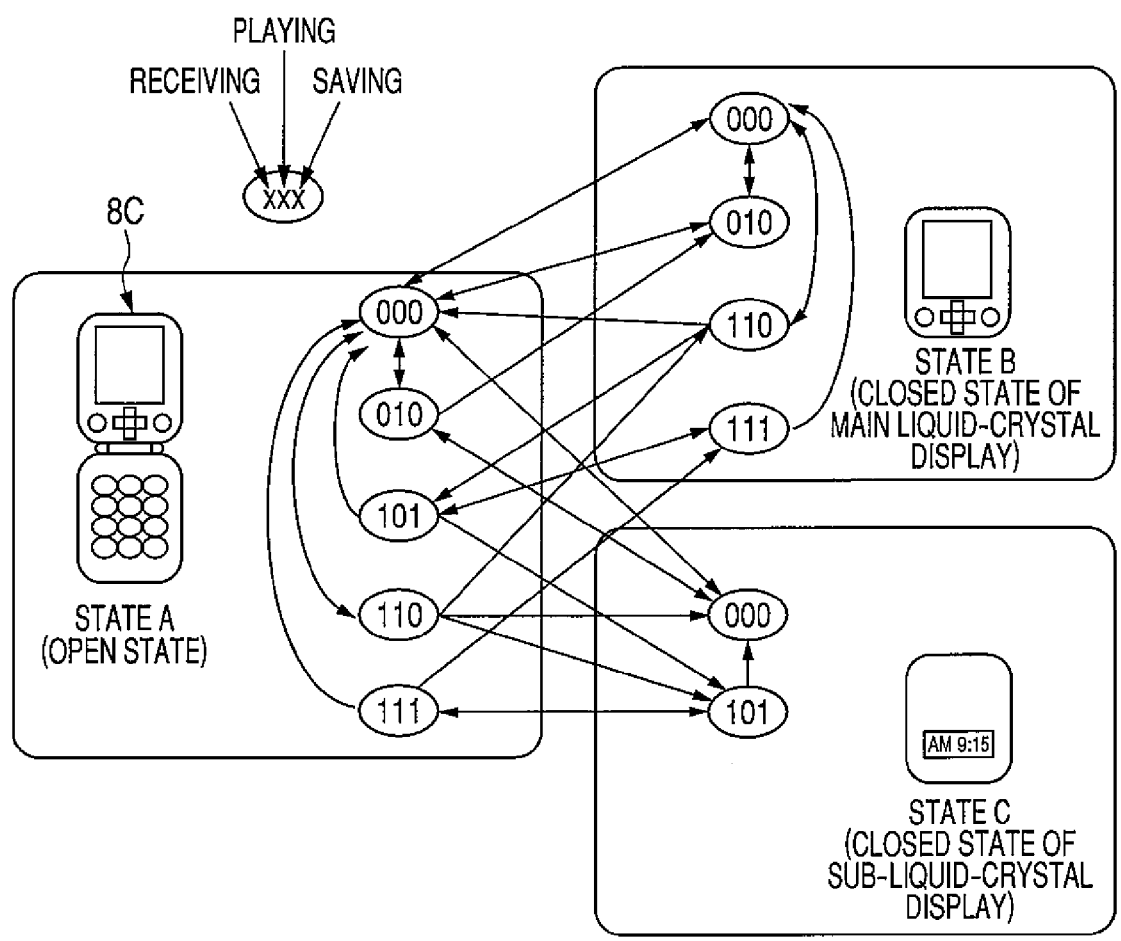
FIG. 6 is a status transition diagram achieved when the wireless communication terminal of the present embodiment is a biaxial rotary portable cellular phone.

FIG. 6 shows an example status transition diagram achieved when the wireless communication terminal of the embodiment is a biaxial rotary portable cellular phone.

A state A shows an open state of the housing; a state B shows a closed state of a main liquid-crystal display; and a state C shows a closed state of a sub-liquid-crystal display. Numerals in an ellipse designate the internal state of the terminal; namely, sequentially designate the receiving state, the playing state, and the saving state of data. Reference numeral 0 designates an invalid state, and 1 designates a valid state (for example: 110→a receiving state ON: a playing state ON: and a saving state OFF)

Internal statuses of the terminal achieved in respective states of the housing will be described later. In order to make an example easy to understand, contents data to be broadcast herein are assumed to be data having the property of periodically being iterated.

<Housing State A>

Internal status 000: All of the receiving state, the playing state, and the saving state are OFF. In this state, when the user instructs playback of the data saved in the memory 83 by means of key entry, there arises a transition to an internal status 010 of the housing state A, where the data are played. When the user instructs viewing of broadcast data in this state (the internal status 000) by means of key entry, there arises a transition to the internal status 110, where receipt and playback of data are commenced. When the internal status 101 of the housing state A changes to this status (the internal status 000) or when the internal status 010 of the housing state B changes to this status (the internal status 000), and when the housing state changes to the housing state B as a result of the housing being closed in this state (the internal status 000), a transition to the internal status 010 of the housing state B arises, and playback is performed. When the housing state comes into the housing state B in other cases as a result of closing of the housing, the internal status remains unchanged. Further, when the housing is closed in this state (the internal status 000), to thus come into the housing state C, the internal state remains unchanged.

Internal status 010: The playing state is ON, and the receiving and saving states are OFF. When in this state the user instructs completion of playback operation by means of key entry or playback of the data saved in the memory 83 is completed, there arises a transition to the internal status 000. When the housing state comes into the housing state B as a result of closing of the housing in this state (the internal status 010), the internal status remains unchanged. When the housing is closed in this state (the internal status 010), to thus come into the housing state C, the user is determined to have closed the housing in order to complete playback operation, and a transition to the internal status 000 arises.

Internal status 101: The receiving and saving states are ON, and the playing state is OFF. This status is a situation where the user is in the middle of performing another operation by means of temporarily interrupting viewing of data and where received data are being saved in the memory 83 through background operation. When receipt of data corresponding to one period is completed in this state (the internal status 101), a transition to the internal status 000 arises. When the housing state comes into the housing state B as a result of the housing being closed in this state (the internal status 101), an operation other than viewing of data is determined to be completed, and a change to the internal status 111 arises, where the saved data are played while received data are being saved in the memory.

Internal status 110: The playing and receiving states are ON, and the saving state is OFF. When the housing is closed in this state, to thus enter the housing state B, the internal status remains unchanged. When the user instructs completion of viewing operation in this state by means of key entry, there arises a transition to the internal status 000 of the housing state A. When the housing state comes into the housing state C in this state (the internal status 110) as a result of the housing being closed, a determination is made as to whether or not data corresponding to one period have already been received. When the data corresponding to one period are already received, the user is determined to close the housing in order to complete receiving and playback operation, and a transition to the internal status 000 of the housing state C arises. When acquisition of the data corresponding to one period is not yet completed, a transition to the internal status 101 arises, and playback is stopped. Saving received data into the memory is commenced.

Internal status 111: All of the receiving state, the playing state, and the saving state are ON. When in this state playback of data corresponding to one period is completed or the user instructs completion of playback by means of key entry, there arises a transition to the internal status 000. When the housing is closed in this state (the internal status 111), to thus enter the housing state B, the internal status remains unchanged. When the housing is closed in this state (the internal status 111), to thus come into the housing state C, a transition to the internal status 101 arises, and playback is stopped. Saving received data into the memory 83 through background operation is continued.

<Housing State B>

Internal status 000: All of the receiving state, the playing state, and the saving state are OFF. When the user instructs playback of the data saved in the memory 83 in this state by means of key entry, there arises a transition to the internal status 010 arises, where data are played. When in this state (the internal status 000) the user instructs reviewing of broadcast data by means of key entry, a transition to the internal status 110 arises, and receipt and playback of data are commenced. When the housing is opened in this state (the internal status 000), to thus come into the housing state A, the internal state remains unchanged.

Internal status 010: The playing state is ON, and the receiving and saving states are OFF. When in this state the user instructs completion of playback operation by means of key entry or when playback of data stored in the memory 83 is completed, there arises a transition to the internal status 000 of the housing state B. When the housing is opened in this state (the internal status 010), to thus enter the housing state A, the user is determined to be attempting to perform another operation by means of temporarily interrupting playback of data, and a transition to the internal status 000 of the housing state A arises, and playback operation is stopped.

Internal status 110: The playing and receiving states are ON, and the saving state is OFF. When in this state the user instructs completion of viewing operation by means of key entry, a transition to the internal status 000 of the housing state B arises. When in this state (the internal status 110) the housing is opened, to thus come into the housing state A, the user is determined to be attempting to perform another operation by means of temporarily interrupting viewing of data, and playback is stopped. Further, a determination is made as to whether or not data corresponding to one period have already been received. When the data corresponding to one period are determined to have already been received, a transition to the internal status 000 of the housing state A arises. When the data corresponding to one period are determined not to be received yet, there arises a transition to the internal status 101, where saving received data into the memory 83 is commenced through background operation.

Internal status 111: All of the receiving state, the playing state, and the saving state are ON. When in this state playback of data corresponding to one period is completed or the user instructs completion of playback by means of key entry, there arises a transition to the internal status 000. When the housing is opened in this state (the internal status 111), to thus enter the housing state A, the user is determined to be attempting to perform another operation by means of temporarily interrupting playback of data, and there arises a transition to the internal status 101, where playback is stopped and saving received data into the memory through background operation is continued.

<Housing State C>

Internal status 000: All of the receiving state, the playing state, and the saving state are OFF. When receipt of data corresponding to one period is completed in the housing state C and a transition arises to this state and when the housing is opened, to thus come into the housing state A, there arises a transition to the internal status 010, where the data saved in the memory 83 are played. In other cases, when the housing is opened, to thus come into the housing state A, the internal status remains unchanged.

Internal status 101: The receiving and saving states are ON, and the playing state is OFF When receipt of data corresponding to one period is completed, there arises a transition to the internal status 000. When receipt of the data corresponding to one period is not yet completed and when the housing is opened, to thus come into the housing state A, a transition to the internal status 111 arises. Saved data are played while received data are being saved in the memory.

Overall control operation of the embodiment will now be described by reference to a flowchart shown in FIG. 7.

The present embodiment is based on the assumption that receipt of 1XEV-DO broadcast content will be commenced while the housing is opened by use of the foldable portable cellular phone and that the open/closed state of the housing will be changed before completion of viewing of all of the contents data. The contents data are assumed to have the property of being periodically iterated.

First, a contents-data-acquired flag is set to OFF in step ST0.

In step ST1, the housing is opened in this state from a folded state.

In step ST2, the user operates a key for starting receipt of broadcast contents data (hereinafter called "contents data"), thereby commencing receiving operation.

Next, in step ST3, a sequence number of the first received contents data is saved in the memory 83 in the terminal. In step ST4, playback of received contents data is commenced.

In step ST5, a determination is made as to whether or not acquisition of contents data corresponding to one period is completed. The sequence number of the contents data being received is compared with the sequence number saved at the time of initiation of receiving operation. When a match exists (or xx % of the entire data is determined to be received), the process proceeds to step ST6.

In step ST6, the contents-data-acquired flag is set to ON.

Next, in step ST7, a determination is made as to whether or not the housing is folded.

When the housing is determined to be closed in step ST7, the contents-data-acquired flag of the memory 83 is checked in step ST8.

When the contents data are determined not to be acquired yet in step ST8, playback of contents data (sound and images) is stopped in step ST9. Saving contents data being received into the memory 83 in the terminal is commenced in step ST10.

In step ST11, a determination is next made as to whether or not acquisition of contents data corresponding to one period is completed. The sequence number of the contents data being received is compared with the sequence number saved at the time of initiation of receiving operation. When a match exists, the process proceeds to step ST12.

In step ST12, the contents-data-acquired flag is set to ON.

In step ST13, saving the contents data into the memory in the terminal is stopped, and in step ST14 receipt of the contents data is stopped.

Next, in step ST15, a determination is made as to whether or not the housing is opened from the folded state.

When in step ST15 the housing is determined to be open, the contents-data-acquired flag is checked in step ST16.

When the flag is determined to be in ON in step ST16, the contents data saved in the memory is played in step ST17.

In step ST18, a determination is made as to whether or not playback of data corresponding to one period has been completed.

When playback of the data is determined to be completed in step ST18, the process proceeds to step ST23, and playback of the contents data is stopped.

When the flag is determined not to be set in ON in step ST16, the contents data corresponding to one period are not yet acquired. Hence, in step ST19 playback of the contents data saved in the memory 83 is commenced while the received data are being saved in the memory 83.

In step ST20, a determination is made as to whether or not acquisition of the contents data corresponding to one period is completed. The sequence number of the contents data being received is compared with the sequence number saved at the time of initiation of receiving operation. When a match exists, the process proceeds to step ST21.

In step ST21, saving the contents data into the memory 83 in the terminal is stopped.

In step ST22, receipt of contents data is stopped, and playback of the contents data is stopped in step ST23.

The above descriptions are provided by reference to the case where contents data to be received are taken as contents data corresponding to one period and where a determination is made as to whether or not the contents data corresponding to one period have already been acquired. However, these operations are processing corresponding to the BCMCS. In the case of a broadcast (such as a television broadcast), a determination as to whether or not a broadcast (a program or service) is completed comes to an object of determination. Both cases fall within the scope of the embodiment of the present invention.

As mentioned above, according to the present embodiment there is provided the control section 82 having the first function of commencing receipt of broadcast contents data in accordance with the open/closed state of the housing that is a result of detection performed by the housing status detection section or completing receiving operation in consideration of contents of received data; the second function of commencing or completing, during receipt of broadcast contents data, saving of data into the storage section 83 in accordance with the open/closed state of the housing that is a result of detection performed by the housing status detection section; and the third function of commencing or completing, during receipt of the broadcast contents data, playback of the data saved in the storage section 83 in accordance with the open/closed state of the housing that is a result of detection performed by the housing status detection section. Hence, the following advantages can be yielded.

Since initiation or completion of receipt of broadcast contents data is instructed while the housing is opened or closed, operation becomes easy. When a change arises in the circumstances of the user, a receiving state can be changed promptly.

Since receiving operation is completed in consideration of contents of received data, unwanted termination of receiving operation or unwanted continual receiving operation is not performed for reasons of a change in the open/closed state. When the user has already finished viewing contents, receiving operation is automatically completed in response to a change in the open/closed state. When the user has not yet finished viewing the contents, receiving is automatically continued, and concurrent saving of data is also possible.

Since initiation or completion of saving of the broadcast contents data into the terminal while the housing remains opened or closed, operation becomes easy. When a change arises in the circumstances of the user, a saving state can be changed immediately.

Playback or termination of broadcast contents data saved in the memory in the terminal is instructed while the housing is opened or closed, and hence operation becomes easy. When a change arises in the circumstances of the user, the playing state can be changed promptly. It becomes easy for the user to implement temporal interruption of viewing and resumption of interrupted viewing of the data.

The present patent application is based on the Japanese Patent Application No. 2005-315469 filed on Oct. 28, 2005 in Japan, whose contents are incorporated hereby as a reference.

What is claimed is:

1. A broadcast receiver comprising:
   a display section;
   an operation section;
   a broadcast receiving section which receives a broadcast content that is broadcasted repeatedly;
   a recording section which records the received broadcast content; and
   a control section, wherein:
   the control section performs a continual receiving operation for a first broadcast of the broadcast content and if failing to receive a part of the broadcast content in the first broadcast, suspends a continual receiving operation after the first broadcast of the broadcast content, until the part of the broadcast content is re-broadcasted, and then the control section receives the part of the broadcast content that is re-broadcasted,
   the control section stops displaying of the broadcast content on the display section and records the broadcast content being received by the broadcast receiving section in the recording section if a first state is detected where the display section is hidden during the broadcast content received by the broadcast receiving section being displayed on the display section, and stops recording operation of the recording section when all broadcast content data are received, and
   the receiving of all broadcast content data including at least both audio data and video data is independent of an arrival of a broadcast end time.

2. The broadcast receiver according to claim 1, wherein the control section continues recording operation and displays on the display section information recorded in the recording section if a change is detected from the first state where the display section is hidden and the broadcast content is recorded in the recording section to a second state where the display section is exposed.

3. The broadcast receiver according to claim 1, wherein the control section predicts a time when the part of the broadcast content is re-broadcasted based on a transfer rate of the broadcast content that has been received.

4. The broadcast receiver according to claim 3, wherein the control section
   intermittently receives control information from a base station while the continual receiving operation is suspended, and
   receives the broadcast content at a time of intermittent receiving of the control information to correct the time when the part of the broadcast content is re-broadcasted.

5. A broadcast receiver comprising:
   a display section;
   an operation section;
   a broadcast receiving section which receives a broadcast content that is broadcasted repeatedly;
   a recording section which records the received broadcast content; and
   a control section, wherein:
   the control section performs a continual receiving operation for a first broadcast of the broadcast content and if failing to receive a part of the broadcast content in the first broadcast, suspends a continual receiving operation after the first broadcast of the broadcast content, until the part of the broadcast content is re-broadcasted, and then the control section receives the part of the broadcast content that is re-broadcasted,
   the control section stops displaying of the broadcast content on the display section and records the broadcast content being received by the broadcast receiving section in the recording section if a first state is detected where the operation section is exposed during the broadcast content received by the broadcast receiving section being displayed on the display section, and stops recording operation of the recording section when all broadcast content data are received, and the receiving of all broadcast content data including at least both audio data and video data is independent of an arrival of a broadcast end time.

6. The broadcast receiver according to claim 5, wherein the control section continues recording operation and displays on the display section information recorded in the recording section if a change is detected from the first state where the operation section is exposed and the broadcast content is recorded in the recording section to a second state where the operation section is hidden.

\* \* \* \* \*